UNITED STATES PATENT OFFICE.

ALBERT NODON, OF BORDEAUX, FRANCE.

ELECTRIC ACCUMULATOR.

1,390,155. Specification of Letters Patent. Patented Sept. 6, 1921.

Application filed November 9, 1918. Serial No. 261,900.

*To all whom it may concern:*

Be it known that I, ALBERT NODON, a citizen of the Republic of France, residing at Bordeaux, France, have invented new and useful Improvements in Electric Accumulators, of which the following is a specification.

Concerning such accumulators, it is a well known fact that in the charging and discharging of the same a certain prescribed limit must not be passed, if the buckling of the plates and the loosening of the oxid pellets is to be avoided. The frequent vibrations, shocks and variations in temperature to which certain classes of electric accumulators are subjected, also result in the loosening of the oxid pellets which drop down between the plates and cause internal short-circuits, thus making it necessary to subject an accumulator, in which this has occurred, to special treatment before it may be again put in use.

To reduce these difficulties, various means have been resorted to: the separation of the positive and negative plates a sufficient distance to prevent them coming in contact if they buckle, or to prevent dislodged pellets from connecting with both the positive and negative plates between which they may fall; and the placing of porous partitions between plates of opposite polarity. Such means, however, have disadvantages. The internal resistance, and the weight and volume of the accumulator are increased when the plates are widely separated; the porous partitions prevent the free exchange of the electrolyte and increase the polarization and sulphation.

It is the primary purpose of the present invention to obviate as far as possible the aforesaid difficulties and, following out a principle deduced from practical experience (the principle that a peroxid maintained in connection with a limited portion of a positive plate acts as though it completely covered the positive plate), the positive plates of the accumulator in question have only a portion of their surfaces covered with the peroxid.

Since the ions liberated by the chemical action on the electrolyte move toward the peroxid and are not evolved on that part of the positive plate which is not so covered, it follows that it is unnecessary to entirely cover the positive plates with peroxid. Therefore, the positive plates of the present invention are so formed and have the peroxid attached in such a way that those portions of the plates which are not covered with the peroxid are the only portions of the plates which face the negative plates. In this way, the positive and negative couples of the present invention are worked intensively and there is little or no danger of the dislodgment of peroxid pellets which may stick between them and thus cause short circuits. Further, there is no danger of buckling as a result of a high rate of charge and discharge.

Thus among the purposes of the invention there appear the provision of means for the prevention of internal short circuits, even though the accumulator be subjected to great vibrations; the ability to discharge and receive a recharge at and with a heavy current; reduction of the internal resistance; and reduction of rapid sulphation. Broadly, the invention comprises the use of electrodes, the negative plates of which are carried above the positive plates, the latter being mounted on a frame and supported in the bottom of the accumulator tank. The number of negative plates employed, as is usual, exceeds the number of main positive plates, but attendant on the positive plates are supplemental positive plates, there being one of these supplemental positive plates for each negative plate. All of the supplemental positive plates and certain portions of the main positive plates have applied to them a peroxid coating in the form of the paste usually employed for this purpose, but the remaining portions of the main positive plates which are not so covered alternate and are interposed between the negative plates.

Since the present invention adheres to the Faure theory of secondary battery construction, the positive and negative plates are constructed chemically on different lines. Red lead or lead peroxid is applied to the positive plates and litharge or lead monoxid is applied to the negative plates. These substances may be attached to the plates by depositing them in suitable scratches, indentations or perforations. The method of application varies greatly in different makes of batteries and any acceptable method may be employed in the present instance. In fact, the plates of the present invention, in so far as their preparation is concerned, is identical with well known methods of accumulator plate construction.

In the accompanying drawings, there is illustrated a cell constructed in accordance with the present invention, this cell being particularly designed as a portable cell.

Figure 1:
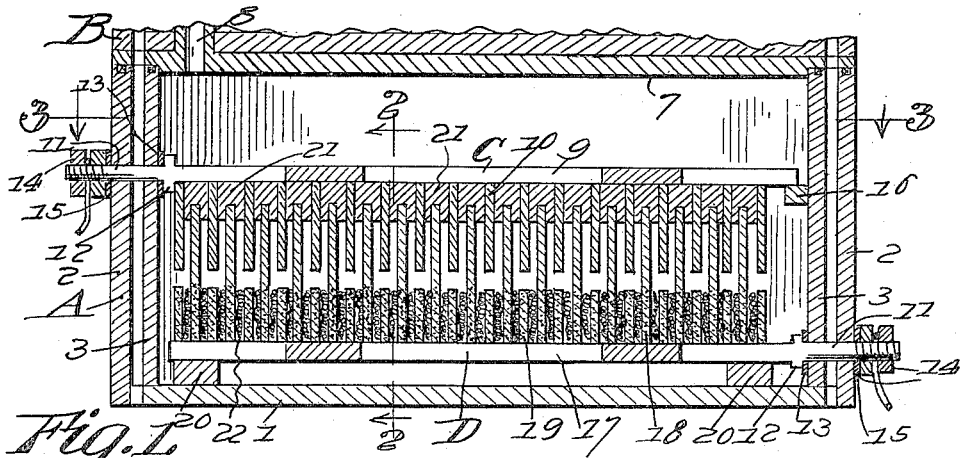
Figure 1 is a longitudinal sectional view through the cell.
Figure 2:
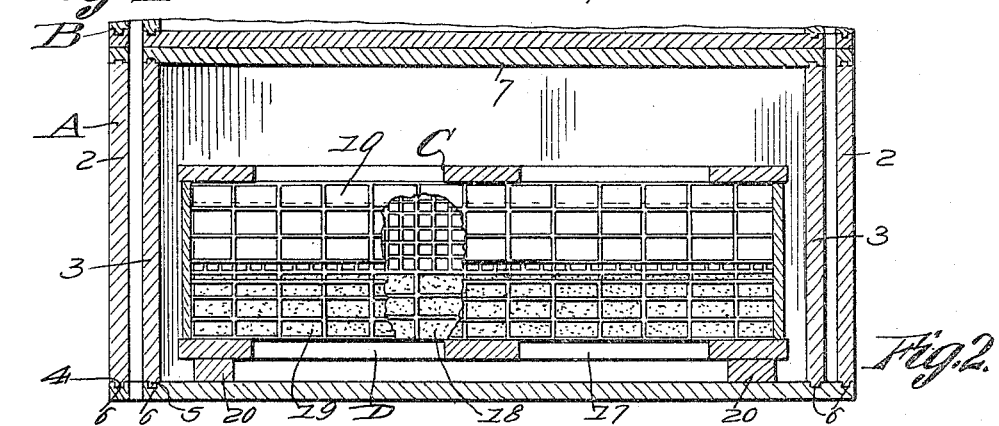
Fig. 2 is a section on the line 2—2 of Fig. 1.
Figure 3:
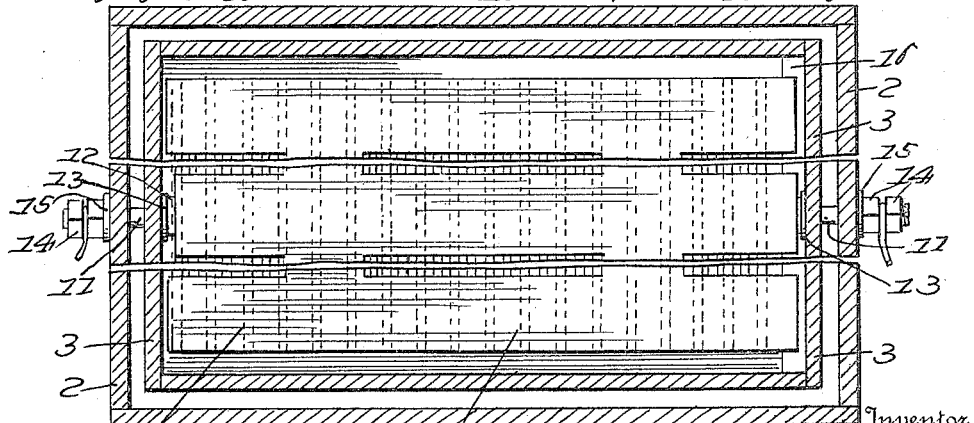
Fig. 3 is a section on the line 3—3 of Fig. 1.

As illustrated, there is shown a tank A which may be made of teak, celluloid or wood. If of the latter substance, the tank should be zinc lined. The form of cell illustrated is one of a battery, the other units of which are set one upon the other on top of it. The tank A is formed with the bottom 1 and the ends and sides 2 and 3. The bottom is rabbeted as shown at 4 and 5 for receiving the tongues 6 of the ends and sides. It will be observed that the ends and sides 2 and 3 are spaced from each other, thus providing an air space which is not conducive for the transfer of the temperatures exterior to the cell to the contents of the latter. The bottom 7 of the tank B rests upon and acts as the top of the tank A, and in this bottom 7 there is attached a tube 8 which places the tanks A and B in communication. The tank which would be mounted on the tank B is identical with the latter and is placed in communication with the same by a tube similar to the tube 8. This means provides for an electrolyte common to all the cells with means for escape of the gases arising therefrom.

The negative element C of the accumulator consists of the lead-antimony frame 9 and plates 10 of the same material. These plates 10 are cast with the frame 9 so that they stand parallel one to the other, but in spaced relation. The frame 9 is designed to support the negative element, and to that end is cast with an extension 11 which passes through one end wall comprising the plates or ends 2 and 3 of the tank. Interior to the tank, this extension is formed with an integral collar 12 between which and the end wall 3 a washer 13 is carried, this washer being preferably of rubber, so that it may form a liquid-tight joint where the extension passes through the end wall. Exterior to the tank, the extension 11 is threaded and receives thereon the nuts 14 between which and the end wall, a washer of rubber or other suitable material is inserted. The extension 11 exterior to the tank constitutes means for connecting the individual units of a battery in series or in parallel as desired, suitable connectors connecting this extension with a similar extension on a connecting cell.

The extension 11 serves as a support for the negative element at one end of the tank; at the opposite end, however, the frame 9 rests upon a rib or support 16 mounted on the inner wall of that end.

The positive electrode D is composed of the hardened lead frame 17, the main positive plates 18 and the supplemental positive plates 19. The frame 17 is supported on the bottom 1 of the tank by blocks 20 made of any material suitable for the purpose, these blocks holding the frame 17 spaced from the bottom 1. This is for the purpose of permitting the free circulation of the electrolyte and to provide a space in which dislodged peroxid pellets may fall. The main positive plates 18 are arranged in parallel relation with each other and are spaced a distance apart equal to the spacing between the negative plates and the positive electrode is so positioned in the tank that the upper portions of the positive plates extend into the spaces between the negative plates, being so positioned between the latter as to provide a space on either side of them between themselves and the said negative plates. The positive plates 18 are cast integrally with the frame 18, as are the supplemental positive plates 19, but these latter stand in the spaces between adjacent positive plates, from which they are separated. The frame 17 is formed with an extension identical with the extension 11, and this extension passes through the end wall of the tank opposite that through which the extension on the frame 9 passes, being attached to its end wall in a manner identical with the attachment of the extension of the frame 9.

The negative plates or grids 10 are cast or pressed into shape so as to provide a number of square or rectangular shaped depressions on opposite faces in which litharge, if this oxid is used, is pressed. Those portions of the main positive plates 18 which face the negative plates are formed in a manner similar to the conformation of the negative plates, but the dimensions of the depression are considerably reduced, as respects the dimensions of the depressions in the negative plates. The remaining portions of the main positive plates 18 are formed with perforations in which peroxid or red lead is pressed, and the supplemental positive plates are similarly formed and similarly receive the red lead paste. Between the adjoining negative plates there are carried shoes 21 made of celluloid, ebonite or any other acceptable material, and these shoes engage the free edges of the positive plates to assist in maintaining the spaced relation between the negative plates and those portions between the negative plates and those portions of the positive plates which are carried between them. Between the supplemental positive plates and the peroxid covered portions of the main positive plates there is inserted a suitable yielding material 22 which may be hair, glass wool or a material possessing similar characteristics.

The electrolyte with the improved accumulator comprises an aqueous solution of sulfuric acid, the specific gravity of which is approximately 1.285.

In the improved accumulator, the chemical action set up results in the oxygen in the electrolyte attacking the negative plates and releasing hydrogen, by the action of which the lead peroxid on the positive plates is reduced to monoxid, and the oxids on both to sulfates. Since the chemical action takes place between the negative plates and the peroxid covered surfaces of the main positive plates and the supplemental positive plates, any distortion resulting from these transformations is confined to the peroxid covered surfaces and therefore, the pure lead extensions of the main positive plates are not affected with the result that there is no tendency of these portions of the main positive plates to buckle.

The particular construction provides for the use of relatively thin both positive and negative plates with a proportionate reduction in the size of the cell as a whole. Further, in the provision of relatively thin plates, a maximum amount of the peroxid is exposed to the action of the electrolyte, thus facilitating the depolarization of the positive plates and the prevention of too quick sulphation.

The invention having been described, what is claimed as new and useful is:

1. An electric accumulator embodying positive plates and a depolarizing oxid applied to but restricted to a definite area on the plates.

2. An electric accumulator embodying a positive electrode comprising main positive plates and supplemental positive plates, and a depolarizing oxid applied to all of the surfaces of the supplemental positive plates and to certain definite portions of the surfaces of the main positive plates.

3. An electric accumulator embodying a positive electrode consisting of a frame, main positive plates formed integral with the frame and in spaced parallel relation to each other and supplemental plates also cast integrally with the frame and interposed between the main positive plates, and an depolarizing oxid applied to all of the surfaces of the supplemental positive plates and to certain definite portions of the surfaces of the main positive plates.

4. An electric accumulator comprising a tank, a negative electrode constituting a frame and grids formed with the frame and depending therefrom, the said negative electrode being supported near the top of the tank, and a positve electrode supported in the bottom of the tank, said positive electrode constituting a frame, main positive plates formed integral with the frame, and supplemental positive plates also formed integral with the frame, the said supplemental plates alternating with the main positive plates, the main positive plates being of greater height than the supplemental positive plates and the extending portions thereof penetrating into the spaces between the negative plates.

5. An electric accumulator embodying a negative electrode comprising spaced parallel plates, a positive electrode also comprising spaced parallel plates, alternate plates of the latter being of one height and succeeding plates of different heights, alternate plates extending into the spaces between the negative plates, and a depolarizing oxid applied to all of the surfaces of the shorter of the positive plates and to positions of the surfaces of the higher positive plates.

6. An electric accumulator embodying a negative element comprising spaced parallel plates, a positive element also comprising spaced parallel plates, alternating plates of said latter element being of one height and succeeding plates of different heights, the longer plates of the positive element projecting into the spaces between the negative plates, a depolarizing oxid applied to all the surfaces of the shorter of the said positive plates and to such of the surfaces of the higher of said positive plates which do not extend in between the negative plates, and a hair or glass-wool filler inserted between the oxid covered surfaces of adjacent positive plates.

In testimony whereof I affix my signature.

ALBERT NODON.